US011887450B2

(12) United States Patent
Gadonniex et al.

(10) Patent No.: US 11,887,450 B2
(45) Date of Patent: Jan. 30, 2024

(54) SMOKE CHAMBER FOR MULTIWAVE MULTIANGLE SMOKE DETECTOR

(71) Applicant: Carrier Corporation, Palm Beach Gardens, FL (US)

(72) Inventors: Dennis Michael Gadonniex, Bradenton, FL (US); Vipul Patel, Sarasota, FL (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/049,723

(22) PCT Filed: May 8, 2019

(86) PCT No.: PCT/US2019/031359
§ 371 (c)(1),
(2) Date: Oct. 22, 2020

(87) PCT Pub. No.: WO2019/217579
PCT Pub. Date: Nov. 14, 2019

(65) Prior Publication Data

US 2021/0233373 A1 Jul. 29, 2021

Related U.S. Application Data

(60) Provisional application No. 62/669,122, filed on May 9, 2018.

(51) Int. Cl.
*G08B 17/107* (2006.01)

(52) U.S. Cl.
CPC .................................. *G08B 17/107* (2013.01)

(58) Field of Classification Search
None
See application file for complete search history.

(56) References Cited

U.S. PATENT DOCUMENTS 3,767,917 A 10/1973 Lampart et al.
4,168,438 A 9/1979 Morisue
(Continued)

FOREIGN PATENT DOCUMENTS

AU 2004239349 A1 11/2004
CN 1095176 A 11/1994
(Continued)

OTHER PUBLICATIONS

Indian Office Action; Indian Application No. 202017046332; dated Apr. 23, 2021; 6 pages.
(Continued)

*Primary Examiner* — John F Mortell
(74) *Attorney, Agent, or Firm* — CANTOR COLBURN LLP

(57) ABSTRACT

An optical chamber assembly of a detection device includes a light ring for supporting at least one light device, an optical cover defining an interior chamber of the optical chamber assembly, and an intermediate component disposed between the light ring and the optical cover. The intermediate component optically couples the at least one light device with the interior chamber. The light ring is formed from a first material, the intermediate component is formed from a second material, and the optical cover is formed from a third material, the first material, the second material, and the third material being different.

12 Claims, 14 Drawing Sheets

(56) References Cited

U.S. PATENT DOCUMENTS

| | | | | |
|---|---|---|---|---|
| 4,845,474 | A * | 7/1989 | Moore | G08B 17/11 340/629 |
| 4,897,634 | A | 1/1990 | Sawa et al. | |
| 5,486,816 | A | 1/1996 | Ariga et al. | |
| 5,719,557 | A * | 2/1998 | Rattman | G08B 17/113 73/304 R |
| 6,057,775 | A | 5/2000 | Sakurai et al. | |
| 6,288,647 | B1 | 9/2001 | Yamano | |
| 6,351,219 | B1 | 2/2002 | Tanguay et al. | |
| 6,737,977 | B2 | 5/2004 | Nishikawa et al. | |
| 6,756,905 | B2 | 6/2004 | Rattman et al. | |
| 6,778,091 | B2 | 8/2004 | Qualey, III et al. | |
| 2002/0084907 | A1* | 7/2002 | Rattman | G08B 17/113 340/630 |
| 2009/0009345 | A1 | 1/2009 | Conforti | |
| 2012/0086345 | A1* | 4/2012 | Tran | F24F 11/30 315/158 |
| 2012/0229283 | A1* | 9/2012 | McKenna | G08B 29/183 340/584 |
| 2012/0262714 | A1 | 10/2012 | Gonzales | |
| 2013/0120150 | A1 | 5/2013 | Aebersold et al. | |
| 2016/0071386 | A1* | 3/2016 | Mittleman | G08B 17/107 73/31.03 |
| 2017/0162019 | A1 | 6/2017 | Cruse et al. | |

FOREIGN PATENT DOCUMENTS

| | | | |
|---|---|---|---|
| CN | 1517699 | A | 8/2004 |
| CN | 101656011 | A | 2/2010 |
| CN | 103906391 | A | 7/2014 |
| CN | 204406599 | U | 6/2015 |
| CN | 105469528 | A | 4/2016 |
| CN | 105517391 | A | 4/2016 |
| CN | 106448029 | A | 2/2017 |
| CN | 106663356 | A | 5/2017 |
| CN | 107533787 | A | 1/2018 |
| DE | 102016209052 | A1 | 11/2017 |
| EP | 0707207 | A2 | 4/1996 |
| EP | 1253566 | A2 | 10/2002 |
| JP | H0455999 | A | 2/1992 |
| JP | 6247449 | B2 | 12/2017 |
| WO | 9621208 | A1 | 7/1996 |
| WO | 2017152163 | A1 | 9/2017 |

OTHER PUBLICATIONS

International Search Report of the International Searching Authority; International Application No. PCT/US2019/031359; International Filing Date: May 8, 2019; dated Aug. 12, 2019; 7 pages.

Written Opinion of the International Searching Authority; International Application No. PCT/US2019/031359; International Filing Date: May 8, 2019; dated Aug. 12, 2019; 12 pages.

Chinese First Office Action; Chinese Application No. 201980031276.7; dated Dec. 24, 2021; 17 pages.

European Office Action; European Application No. 19725563.1; dated Feb. 4, 2022; 6 pages.

Chinese Second Office Action; Chinese Application No. 201980031276.7; dated May 16, 2022; 15 pages.

Chinese Third Office Action; Chinese Application No. 201980031276.7; dated Aug. 31, 2022; 21 pages.

Indian Office Action; Indian Application No. 202118048173; Issued: Jun. 9, 2022; dated Nov. 2, 2022; 6 pages.

European Office Action for European Application No. 19 725 563.1; dated Jan. 16, 2023; 6 Pages.

* cited by examiner

SMOKE CHAMBER FOR MULTIWAVE MULTIANGLE SMOKE DETECTOR

CROSS REFERENCE TO RELATED APPLICATIONS

This application is a National Stage application of PCT/US2019/031359 filed May 8, 2019, which claims priority to U.S. Provisional application 62/669,122 filed May 9, 2018, both of which are incorporated by reference in their entirety herein.

BACKGROUND

The embodiments disclosed herein relate to smoke detectors and, more particularly, to photo-electric smoke detectors using multiple light emitters and receivers.

A smoke detector is a device that detects smoke and issues an alarm. A photoelectric smoke detector, meanwhile, is a type of smoke detector that works based on light reflection principals and generally includes a light emitter, a light receiver and an optic chamber. When there is no smoke in the optic chamber and the optic chamber is empty or mostly empty, the light receiver typically receives a small amount of light reflected from chamber surfaces. On the other hand, when smoke is present in the optic chamber, the light receiver receives more light due to that light being reflected from the smoke particles. When an amount of the received light exceeds a predetermined level, an alarm is triggered.

Existing photo-electric smoke detectors are not typically able to discriminate between large-size non-smoke particles, such as steam clouds, dust clouds, etc., and small-size non-smoke particles that are generated by certain types of cooking scenarios. As a result, such photo-electric smoke detectors are unlikely to pass the revised Underwriter Laboratories (UL) 217 standard.

A new photo-electric smoke detector using a multiwave, multiangle chamber has been designed to meet this standard. However, some of these detectors require an optics chamber having a high flame rating, while absorbing stray radiation from both the light sources and external ambient light. The optical chamber additionally needs to be electrically conductive to provide electromagnetic induction shielding and dust resistance while electrically insulating an adjacent printed circuit board. A single material is incapable of performing all of these functions.

BRIEF DESCRIPTION

According to an embodiment, an optical chamber assembly of a detection device includes a light ring for supporting at least one light device, an optical cover defining an interior chamber of the optical chamber assembly, and an intermediate component disposed between the light ring and the optical cover. The intermediate component optically couples the at least one light device with the interior chamber.

In addition to one or more of the features described above, or as an alternative, in further embodiments the light ring is formed from a first material, the intermediate component is formed from a second material, and the optical cover is formed from a third material, the first material, the second material, and the third material being different.

In addition to one or more of the features described above, or as an alternative, in further embodiments the light ring is formed from an electrically insulating, high flame rated material.

In addition to one or more of the features described above, or as an alternative, in further embodiments the material of the light ring has limited light absorbing properties.

In addition to one or more of the features described above, or as an alternative, in further embodiments the intermediate component is formed from a highly electrically conductive material with high light absorbing properties.

In addition to one or more of the features described above, or as an alternative, in further embodiments the optical cover is formed from a highly electrically conductive, high flame rated material.

In addition to one or more of the features described above, or as an alternative, in further embodiments the optical cover has high light absorbing properties.

In addition to one or more of the features described above, or as an alternative, in further embodiments the optical cover includes a plurality of openings through which air is provided to the interior chamber.

In addition to one or more of the features described above, or as an alternative, in further embodiments the at least one light device includes a light source and a light receiver.

In addition to one or more of the features described above, or as an alternative, in further embodiments the optical cover is removably coupled to the intermediate component.

In addition to one or more of the features described above, or as an alternative, in further embodiments the optical chamber assembly is mounted to a printed circuit board and the intermediate component removably couples the light right to the printed circuit board.

In addition to one or more of the features described above, or as an alternative, in further embodiments the optical cover is connected to one of a ground, common or zero volt of the printed circuit board.

In addition to one or more of the features described above, or as an alternative, in further embodiments comprising a screen connected to the optical cover to prevent debris from entering the interior chamber.

According to another embodiment, a detection device includes a printed circuit board and an optical chamber assembly connected to the printed circuit board. The optical chamber assembly includes a plurality of components formed from a first material, a second material, and a third material. The first material, second material, and third material are different. The detection device additionally includes at least one light device for evaluating particles within the air inside the optical chamber assembly.

In addition to one or more of the features described above, or as an alternative, in further embodiments the plurality of components includes a first component, a second component, and a third component, the first component being formed from the first material, the second component being formed from the second material, and the third component being formed from the third material.

In addition to one or more of the features described above, or as an alternative, in further embodiments the first material has electrically insulating properties and a high flame rating.

In addition to one or more of the features described above, or as an alternative, in further embodiments the electrically insulating properties provide high electrical potential protection between the printed circuit board and the optical chamber assembly.

In addition to one or more of the features described above, or as an alternative, in further embodiments the first material insulates a wire of the at least one light device from shorting.

In addition to one or more of the features described above, or as an alternative, in further embodiments the high flame rating is V0 or a higher range as defined by UL217.

In addition to one or more of the features described above, or as an alternative, in further embodiments the first material has limited light absorbing properties.

In addition to one or more of the features described above, or as an alternative, in further embodiments the first material has a limited amount of carbon filler.

In addition to one or more of the features described above, or as an alternative, in further embodiments the second material is highly electrically conductive and has high light absorbing properties.

In addition to one or more of the features described above, or as an alternative, in further embodiments the second material includes high concentrations of carbon filler.

In addition to one or more of the features described above, or as an alternative, in further embodiments the third material is highly electrically conductive and high flame rated.

In addition to one or more of the features described above, or as an alternative, in further embodiments the third material has high light absorbing properties.

In addition to one or more of the features described above, or as an alternative, in further embodiments the second component is removably coupled to the printed circuit board via a snap fit connection.

In addition to one or more of the features described above, or as an alternative, in further embodiments the second component includes at least one tab receivable within an opening formed in the printed circuit board.

In addition to one or more of the features described above, or as an alternative, in further embodiments the first component is positioned between the printed circuit board and the second component.

In addition to one or more of the features described above, or as an alternative, in further embodiments the third component is removably coupled to the second component via a snap fit connection.

In addition to one or more of the features described above, or as an alternative, in further embodiments the third component includes at least one tab receivable within an opening formed in the second component.

BRIEF DESCRIPTION OF THE DRAWINGS

The following descriptions should not be considered limiting in any way. With reference to the accompanying drawings, like elements are numbered alike.

DETAILED DESCRIPTION

A photo-electric smoke detector with an electrically conductive optics chamber having a high flame rating, capable of absorbing stray radiation from both light sources and external ambient light, and electrically insulating an adjacent printed circuit board is described.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
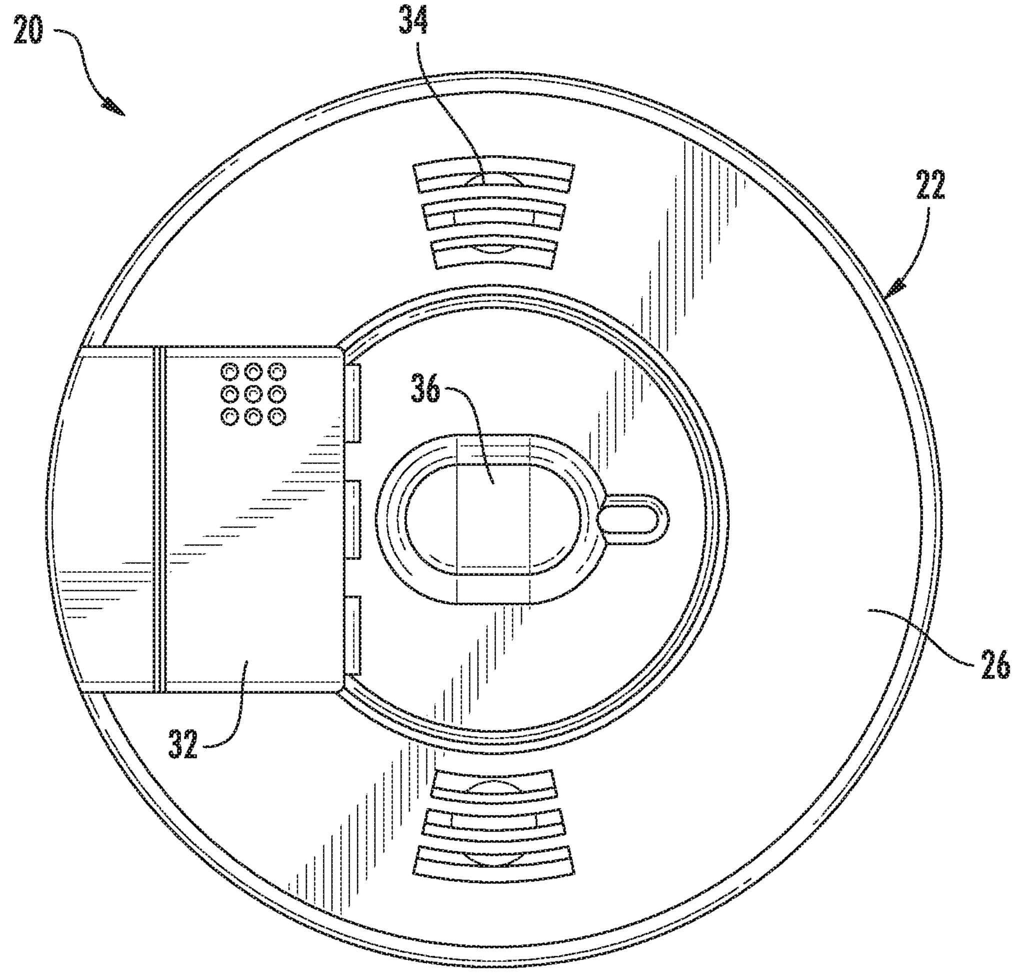
FIG. 1 is a plan view of an example of a life safety device.
Figure 2:
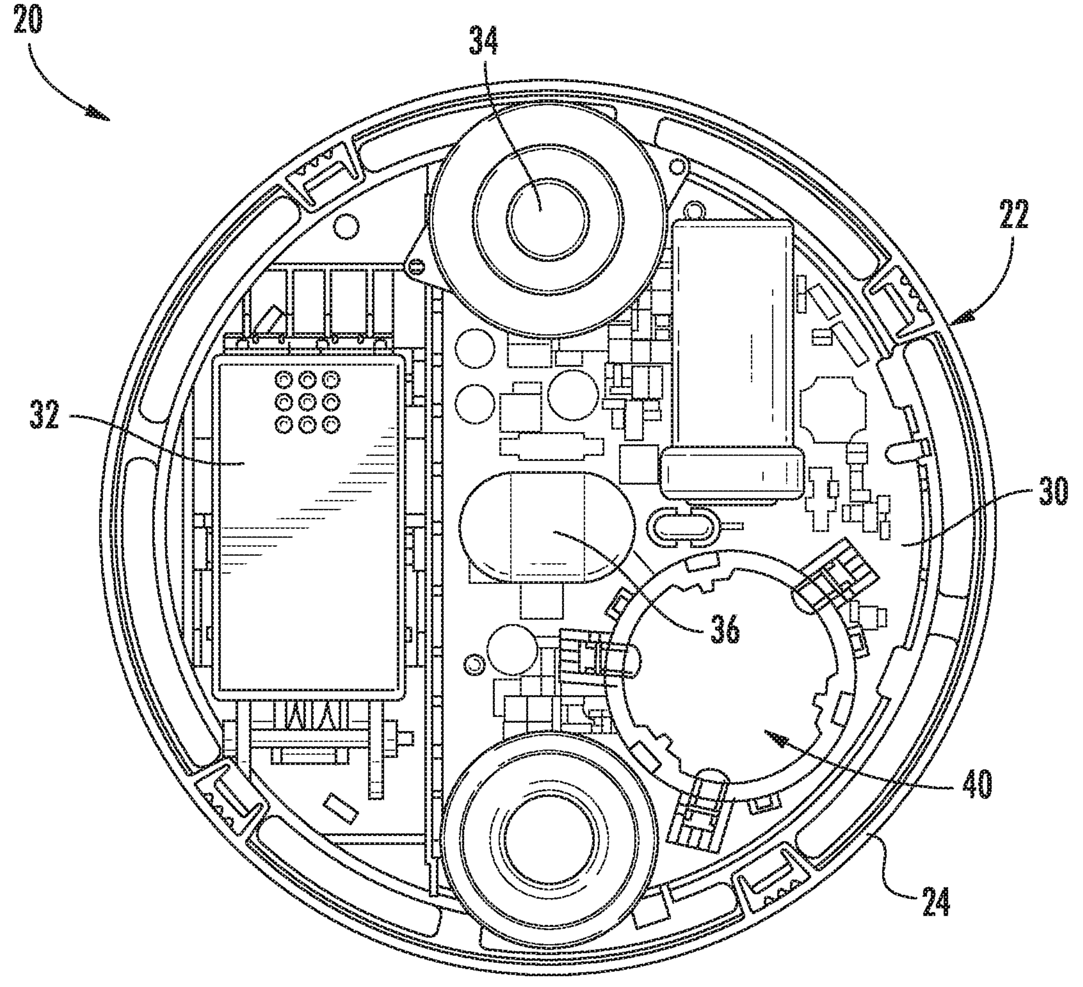
FIG. 2 is a plan view of the life safety device of FIG. 1 with the lower portion of the housing removed according to an embodiment.

With reference now to FIGS. 1 and 2, an example of a life safety device, such as a photo-electric smoke detector for example, is illustrated. As shown, the life safety device 20 includes a housing 22 including a first upper housing portion 24 (best shown in FIG. 2) and a second, lower housing portion 26 that is removably connected to the first housing portion 24. When the first and second housing portions 24, 26 are connected, the first and second housing portions 24, 26 enclose the controls and other components necessary to operation of the device 20. As used herein, the terms "upper", "lower", and the like are in reference to the device 20 in use as it is mounted on a surface, such as a ceiling in a building for example. Therefore, the upper housing portion 24 is typically closer to the ceiling than the lower housing portion 26, and the lower housing portion 26 is typically the portion of the device 20 that will face downward toward the floor of the building. In some embodiments device 20 may be mounted on a wall such that upper housing portion 24 is closer to the wall than the lower housing portion 26, and the lower housing portion 26 is typically the portion of the device 20 that will face outward toward the interior space of the room or space to be monitored.

The life safety device 20 further includes controls including a printed circuit board 30 disposed within the upper housing portion (best shown in FIG. 2). The printed circuit board 30 includes the circuitry and/or components associated with at least one detection circuit (not shown) and at least one alarm circuit (not shown). In some embodiments, the device 20 may be hardwired to a power source (not shown) located within the building or area where the device 20 is mounted, remote from the device 20. In such embodiments, the printed circuit board 30 may be directly or indirectly connected to the power source. In an embodiment, the device 20 may include a compartment 32 for receiving one or more batteries sufficient to provide the power necessary to operate the device 20 for an extended period of time. In an embodiment, the power provided by the batteries may be the sole source of power used to operate the device 20. However, in other embodiments, the battery power may be supplemental to the remote power source, for example in the event of a failure or loss of power at the power source.

A sound generation mechanism 34 may be connected to the printed circuit board 30 within the housing 22. The sound generation mechanism 34 is operable to receive power from the printed circuit board 30 to generate a noise in response to detection of a condition. In addition, one or more actuatable mechanisms 36, such as a button for example, is connected to the printed circuit board 30 and is received within an opening formed in the lower housing portion 26. The actuatable mechanism 36 may be configured to perform one or more functions of the life safety device 20 when actuated. Examples of operations performed via the actuatable mechanism 36 include, but are not limited to, a press to test function, a smoke alarm "hush", a low battery "hush", and end of life "hush", radio frequency enrollment of additional life safety detectors 20 such as in a detection system including a plurality of life safety detectors configured to communicate with one another wirelessly, and to reset the unit once removed from its packaging. Although the actuatable mechanism 36 is shown positioned at the center of the lower housing portion 26, embodiments where the actuatable mechanism 36 is located at another position are also within the scope of the disclosure.

The life safety device 20 additionally includes one or more components that define an optical chamber assembly 40 within the interior of the housing 22. The optical chamber assembly 40 is generally open to the area surrounding the life safety device 20 and is thus receptive of ambient materials through a grating or another similar feature. The ambient materials may include air as well as smoke and non-smoke particles that are carried by the air.

With reference now to FIGS. 3-12, the optical chamber assembly 40 of the life safety device 20 is illustrated and described in more detail. As shown, the optical chamber assembly 40 is defined by a plurality of coupled components. A first or bottom component of the optical chamber assembly 40 includes a light ring 42 configured to receive and couple one or more light devices to the printed circuit board 30. As shown, the light ring 42 has a body 44 that is generally circular in shape and includes at least one base 46 protruding outwardly from the light ring 42. The one or more bases 46 may be integrally formed with or may be connectable to body 44 of the light ring 42. In the illustrated non-limiting embodiment, the light ring 42 includes three separate bases 46 disposed at various locations about a periphery of the light ring 42. However, it should be understood that a light ring 42 having any number of bases 46 is contemplated herein. Each base 46 may include an inner surface 47 (shown in an exemplary embodiment in FIG. 5) having a shape complementary to the light device received thereon. Further, an opening 49 may be formed in each base 46 through which one or more connectors of a light device may extend for connection to the printed circuit board 30.

Figure 4:
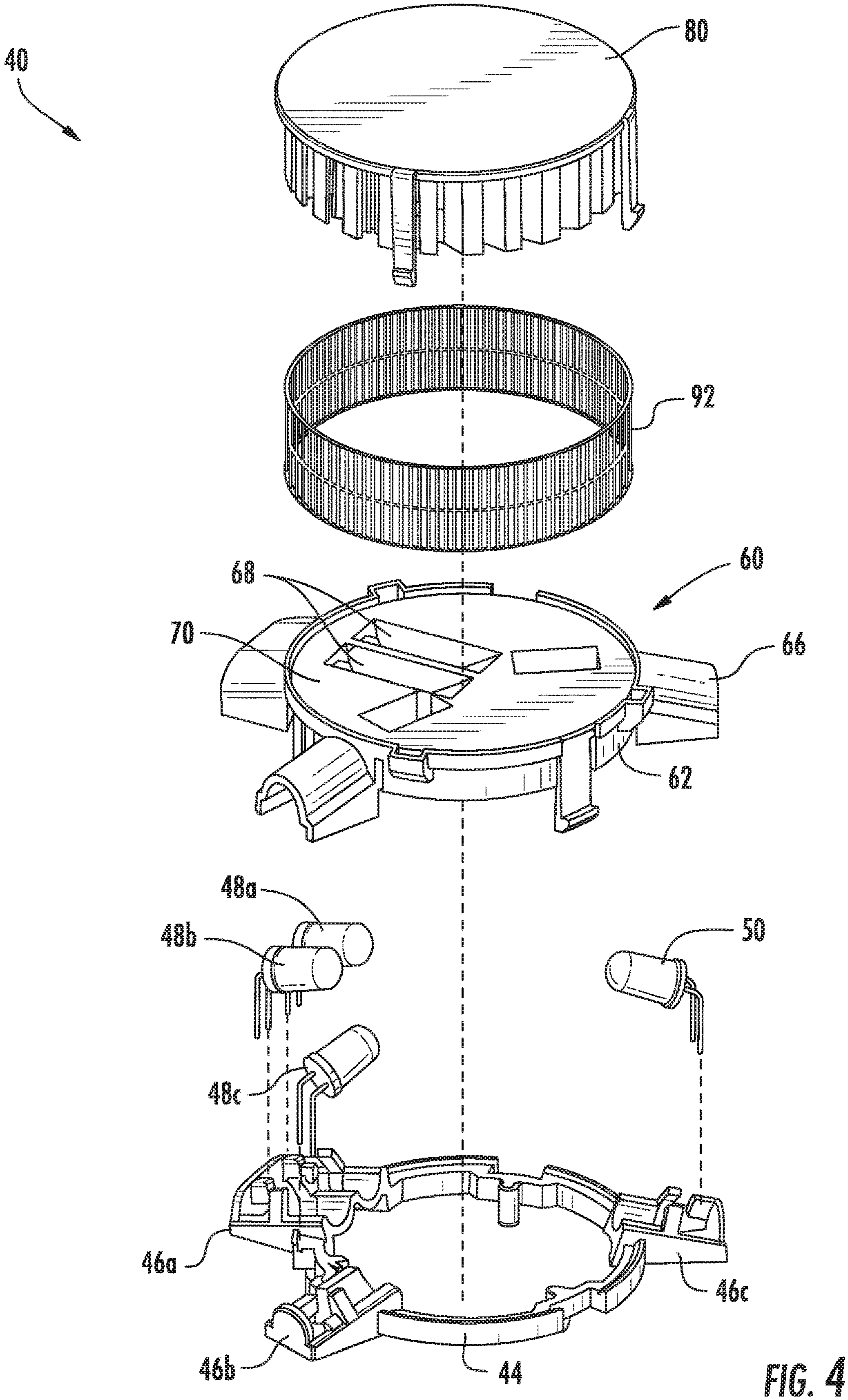
FIG. 4 is an exploded perspective view of an optical chamber assembly of a life safety device according to an embodiment.
Figure 5:
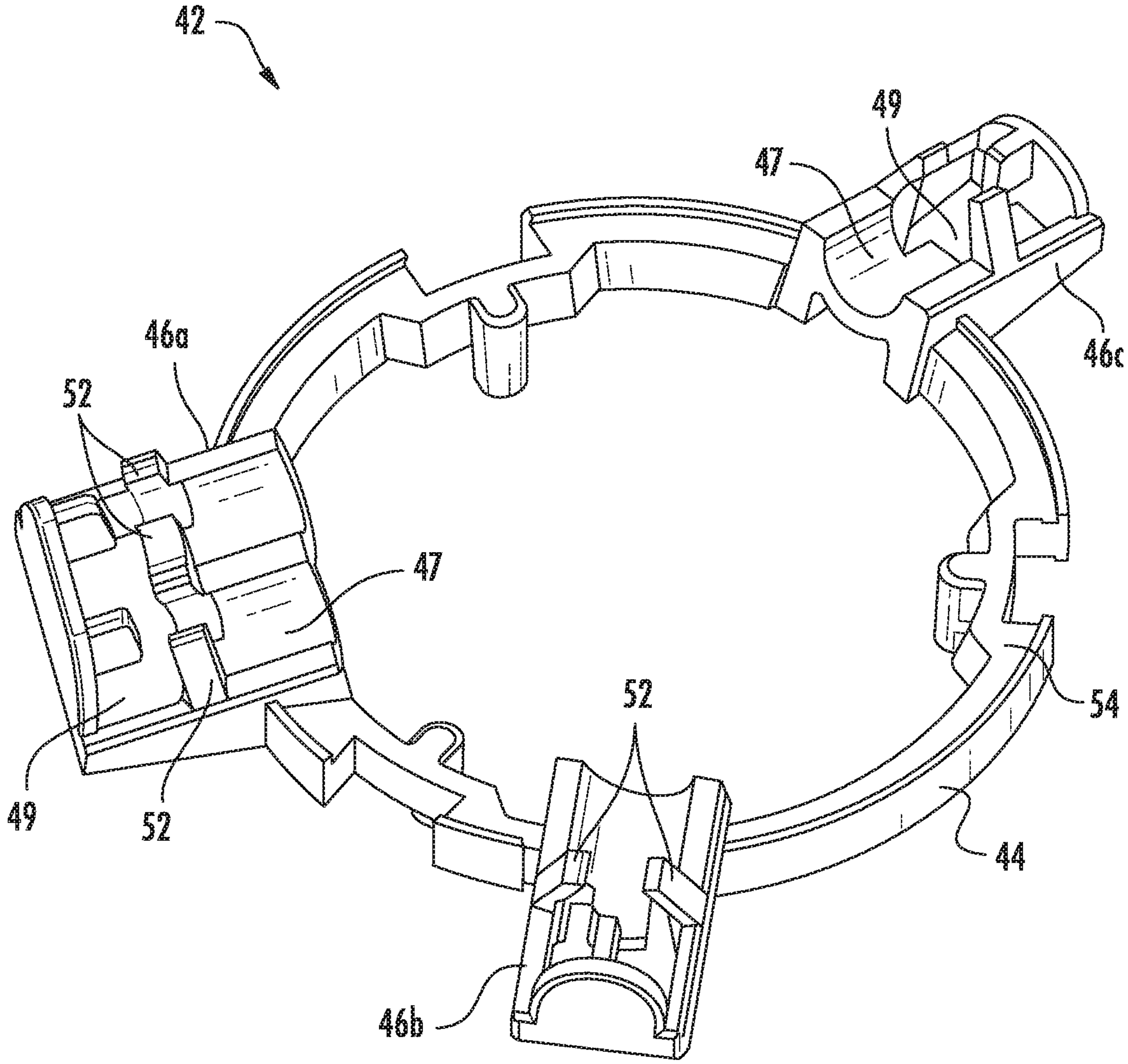
FIG. 5 is a perspective view of a light ring of the optical chamber assembly of FIG. 3 according to an embodiment.

In the illustrated, non-limiting embodiment of FIGS. 4-5, light ring 42 includes a first base **46*a* for receiving both a first light source 48*a* and a second light source 48*b*, such as light emitting diodes for example. Although both light sources 48*a*, 48*b* are coupled to a single base 46*a*, in other embodiments, each light source 48*a*, 48*b* may be mounted to a distinct base 46. The first light source 48*a* and the second light source 48*b* may be selected to emit light having different wavelengths. For example, the first light source 48*a* may emit a first color light and the second light source 48*b* may emit a second, distinct color light. Alternatively, the first light source 48*a* may emit a first light within a visible spectrum and the second light source 48*b* may emit a second light outside of the visible spectrum, such as infrared light for example. A second base 46*b* of the light ring 42 is configured to support a third light source 48*c*. The third light source 48*c* is arranged at an angle to the light emitted by the first and second light sources 48*a*. 48*b* and may emit light having the same wavelength or a different wavelength than the first and second light sources 48*a*, 48*b*. A third base 46*c* is adapted to receive a light receiver 50. In an embodiment, each base 46 includes one or more arms 52 extending outwardly therefrom to restrict movement of the light source 48 or light receiver 50 coupled thereto relative to the base 46, such as in the event that the device 20** is dropped for example.

Figure 6:
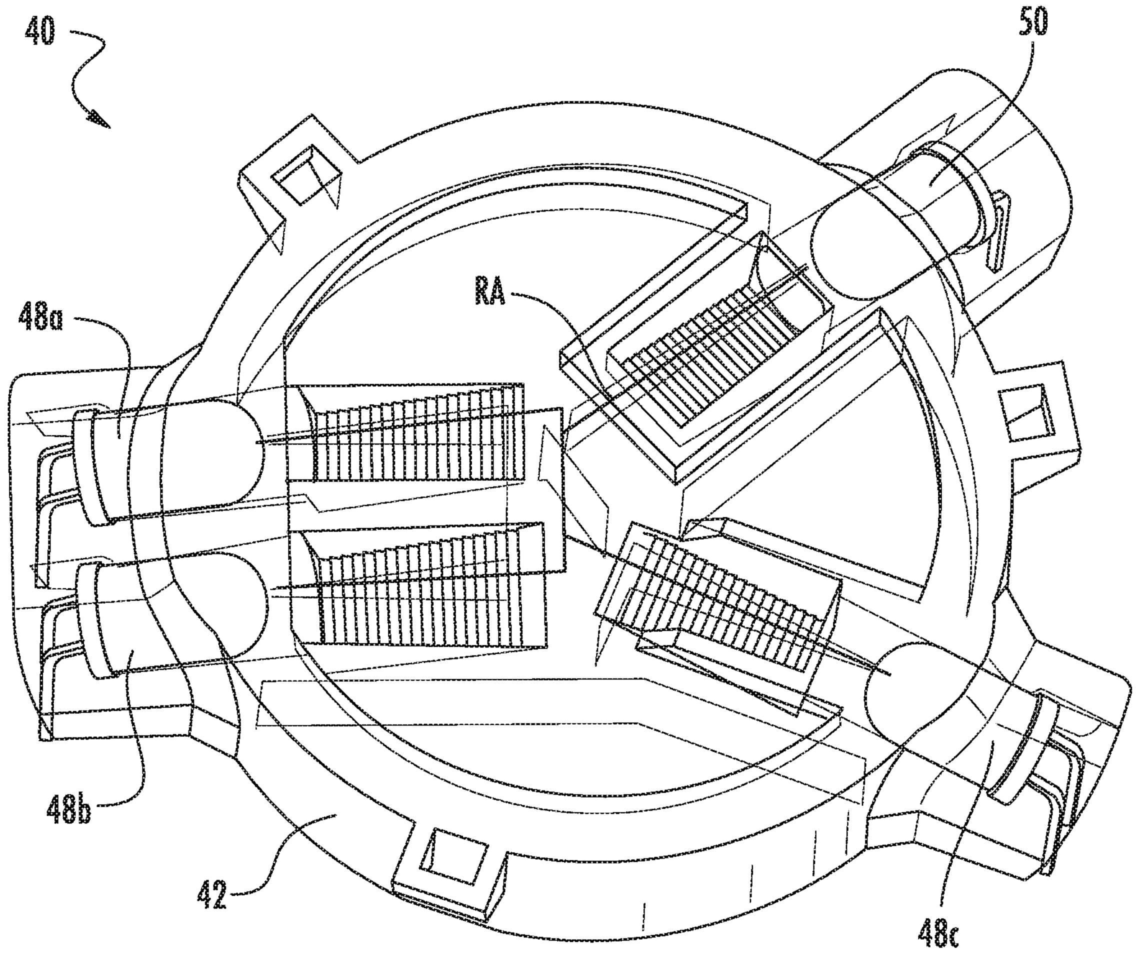
FIG. 6 is a perspective view of the interaction between the plurality of light devices mounted to the light ring according to an embodiment.

As best shown in FIG. 6, the light receiver 50 is disposed to receive light that is emitted by one of the light sources **48*a*, 48*b*, 48*c* and that is then reflected from a chamber (not shown) within the optical chamber assembly 40 by the ambient materials toward the light receiver 50 along a light receiving axis RA of the light receiver 50. The light receiver 50 may be provided as any suitable photoelectric light receiving element and is configured to generate an output electric signal in accordance with light being received. That is, for light that is emitted by the first light source 48*a*, reflected by the ambient materials in the chamber and then received by the light receiver 50 along the light receiving axis RA, the light receiver 50 generates a first output signal. Similarly, for light that is emitted by the second and third light sources 48*b*, 48*c*, reflected by the ambient materials in the chamber and then received by the light receiver 50 along the light receiving axis RA, the light receiver 50 generates a second and third output signal, respectively. It should be understood that in addition to each of the light sources 48*a*, 48*b*, 48*c* being arranged at an angle relative to the light receiver 50, each of the bases may be oriented such that the corresponding light source 48*a*, 48*b*, 48*c*, 50 or light receiver mounted therein is arranged at a desired angle relative to the horizontal plane defined by the light ring 42**.

Figure 3:
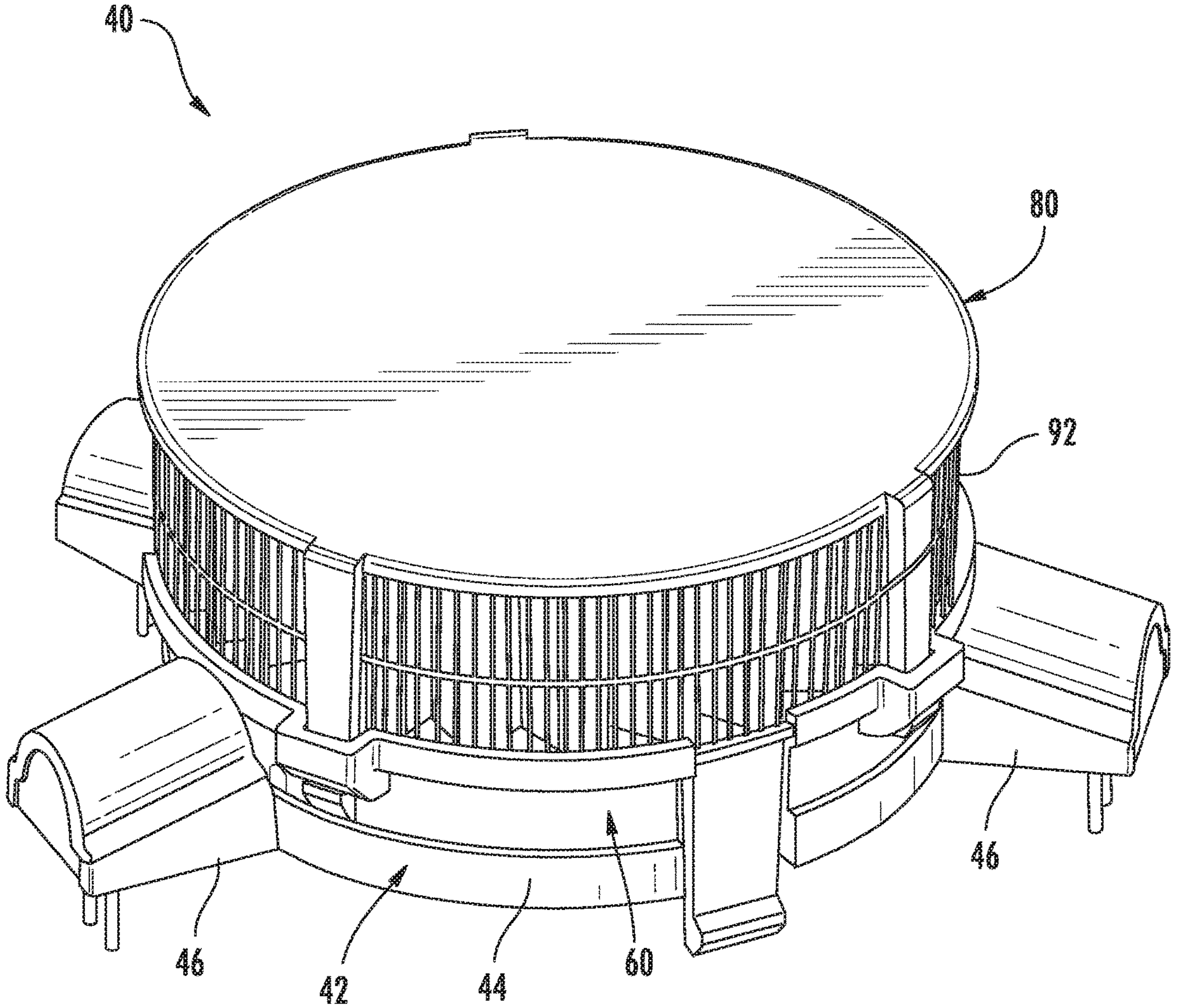
FIG. 3 is a perspective view of an optical chamber assembly of a life safety device according to an embodiment.
Figure 7:
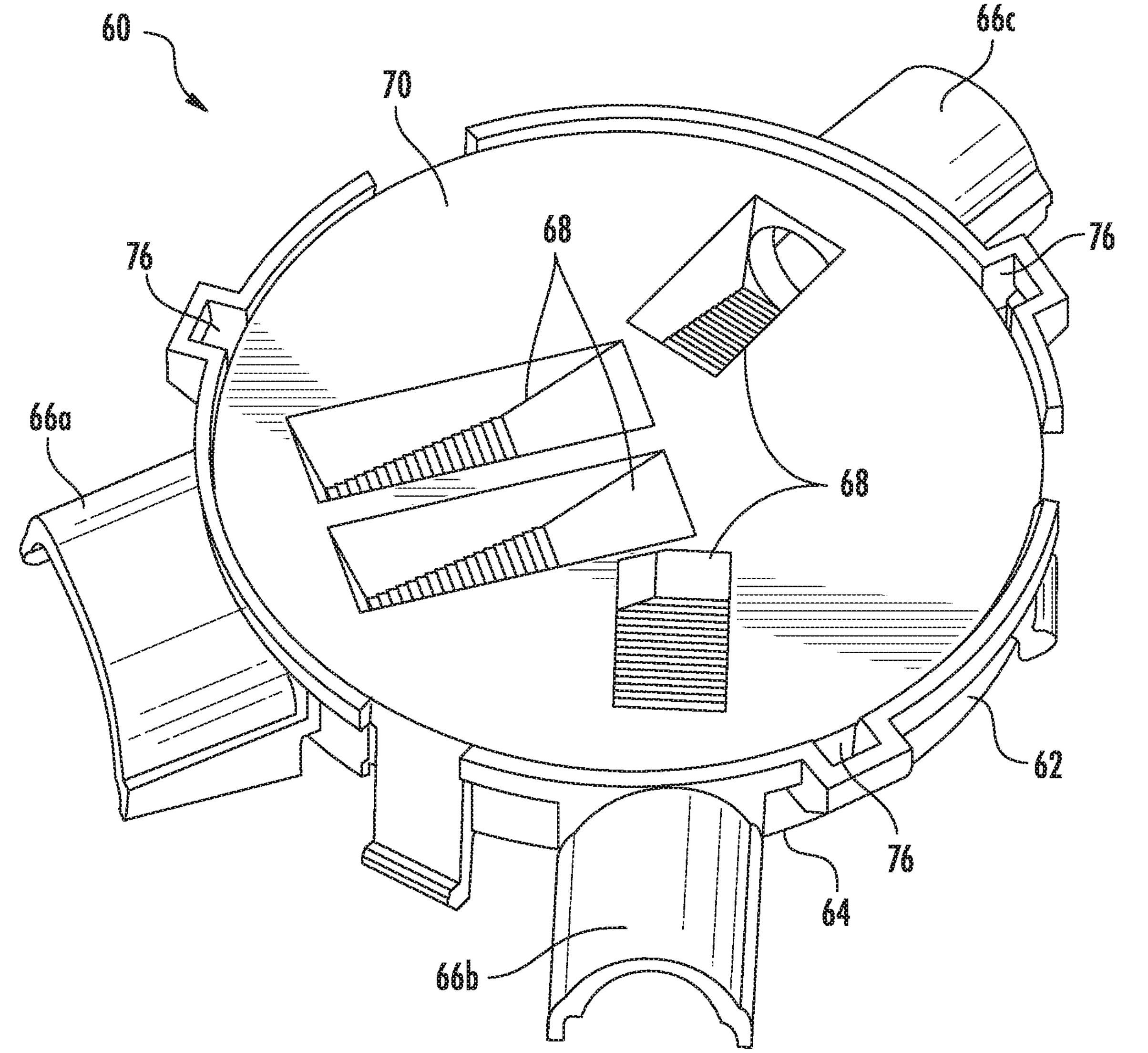
FIG. 7 is a top perspective view of an intermediate component of the optical chamber assembly of FIG. 3 according to an embodiment.
Figure 8:
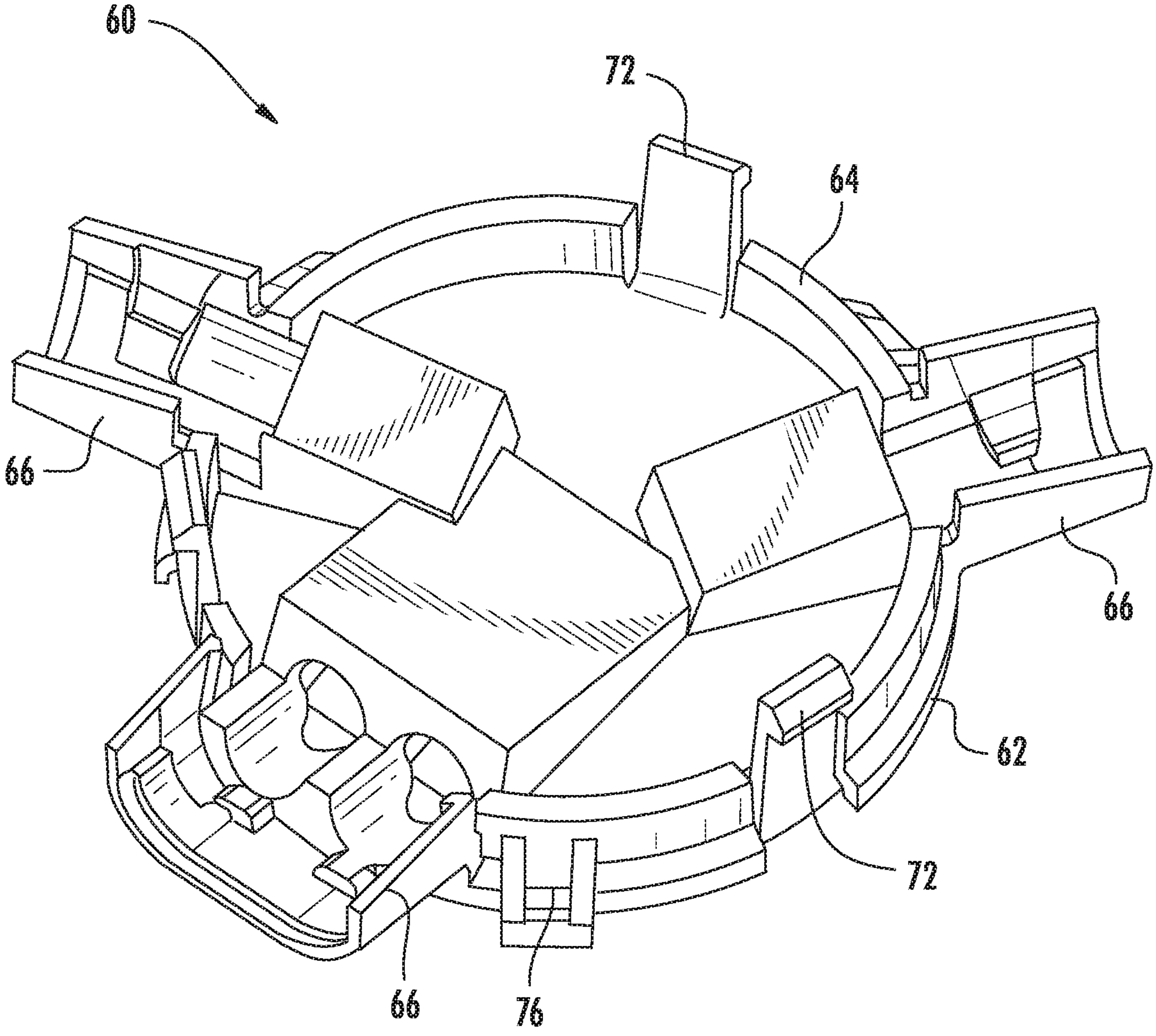
FIG. 8 is a bottom perspective view of an intermediate component of the optical chamber assembly of FIG. 3 according to an embodiment.
Figure 9:
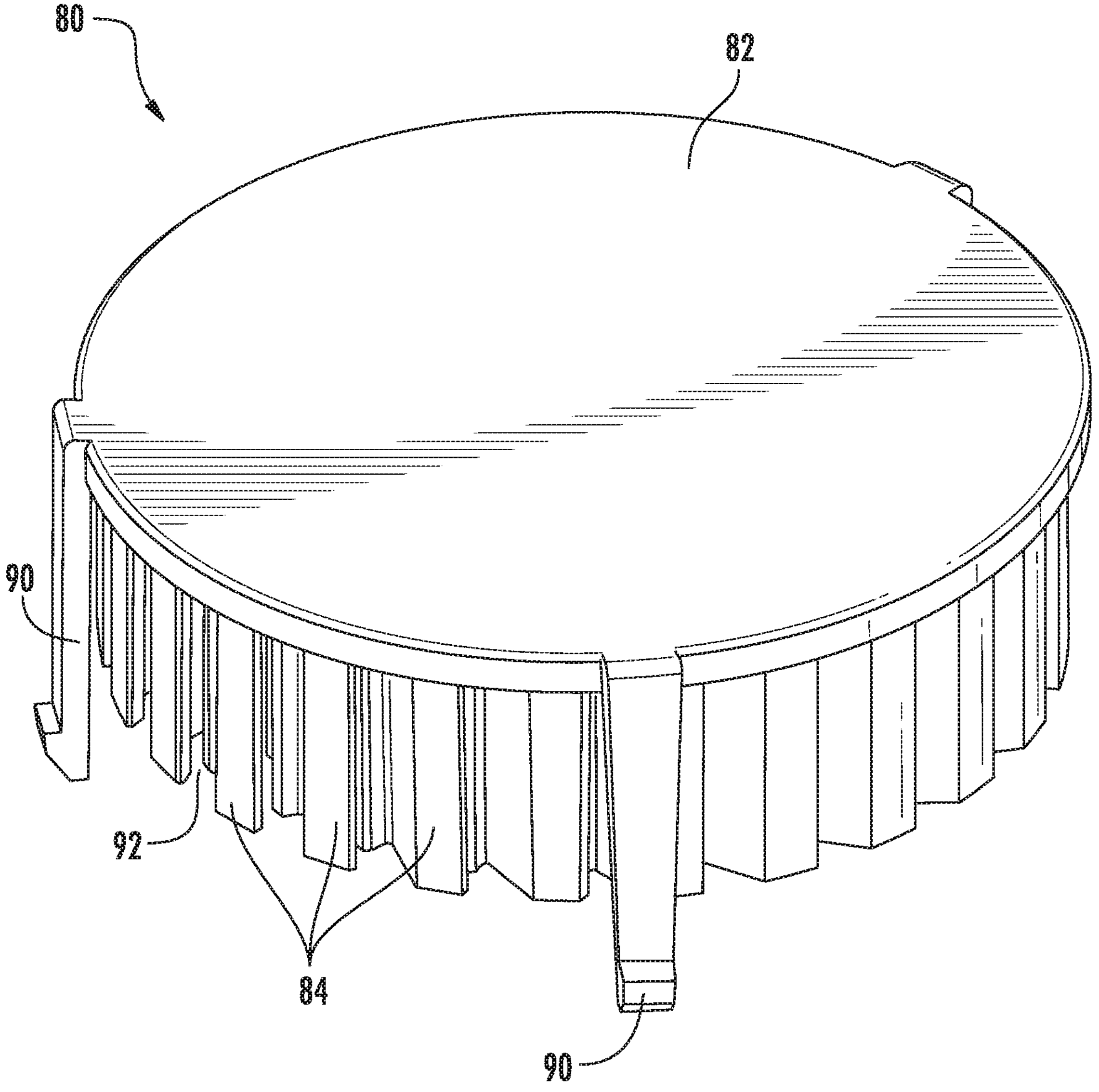
FIG. 9 is a top perspective view of an optical cover of the optical chamber assembly of FIG. 3 according to an embodiment.
Figure 10:
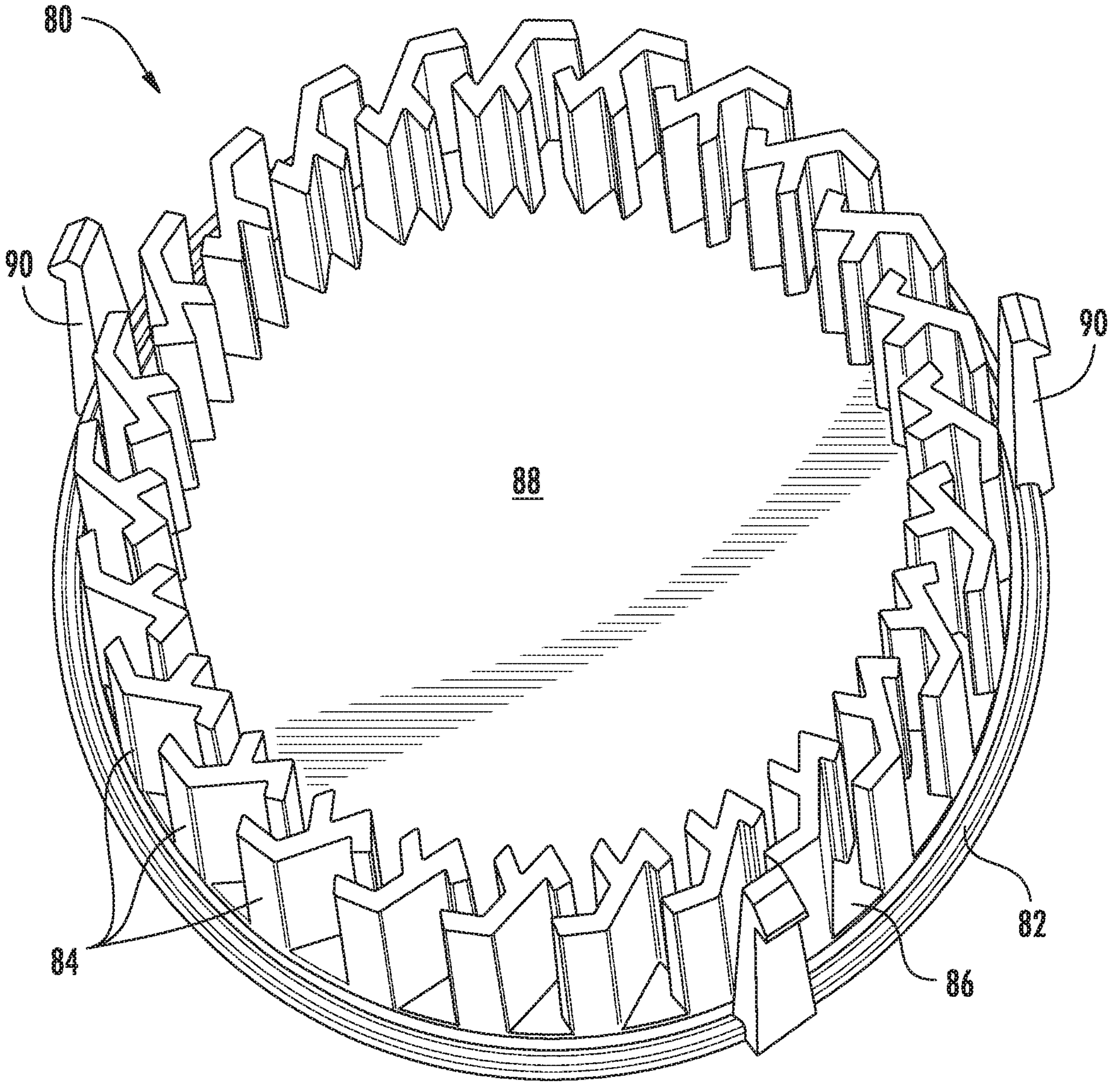
FIG. 10 is a bottom perspective view of an optical cover of the optical chamber assembly of FIG. 3 according to an embodiment.
Figure 10A:
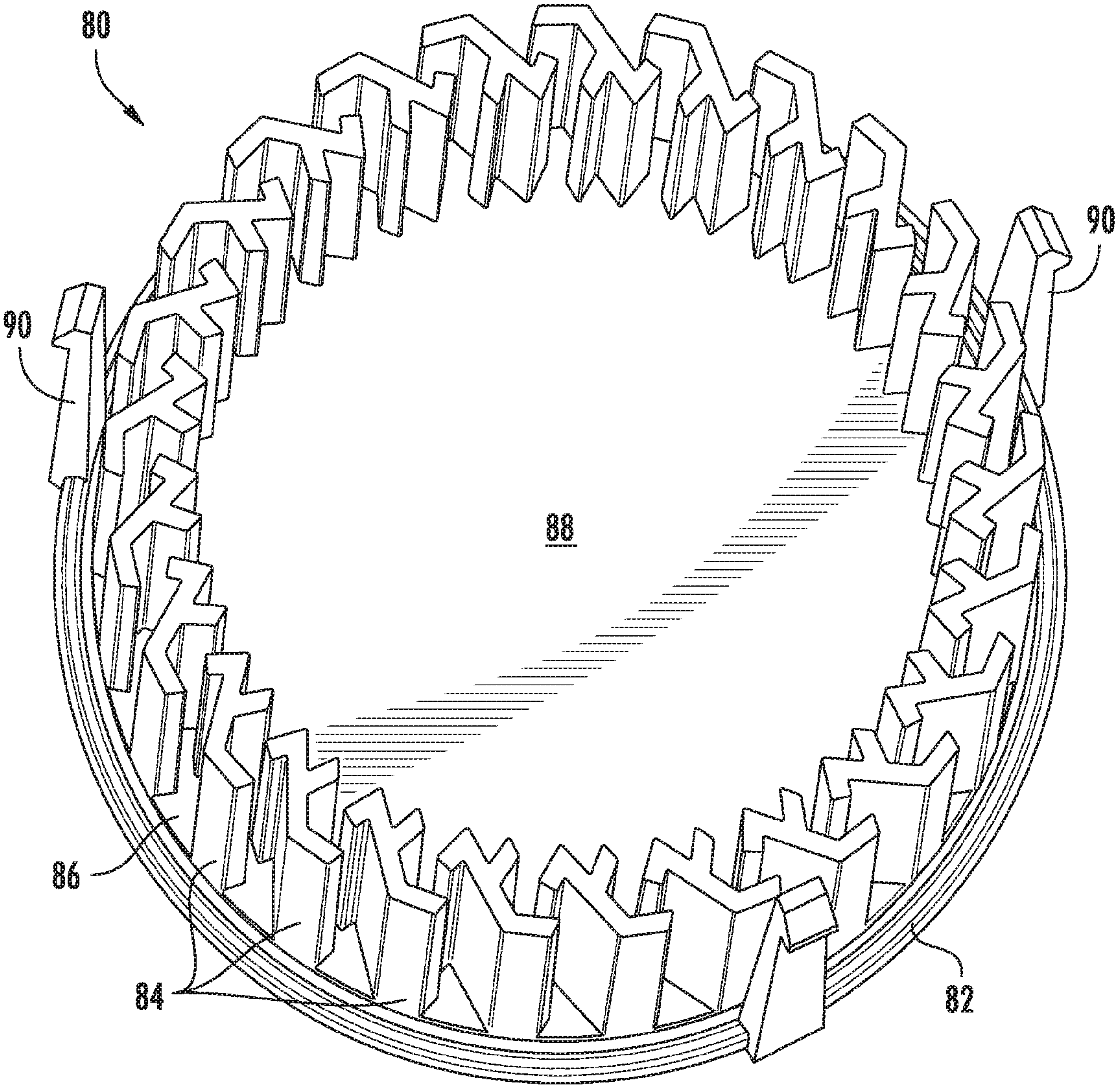
FIG. 10A is a bottom perspective view of another optical cover of the optical chamber assembly of FIG. 3 according to an embodiment.

As shown in FIGS. 3-4, and described below with reference to FIGS. 7 and 8, an intermediate component 60 is adapted to mount in overlapping relationship with the light ring 42. In an embodiment, the intermediate component 60 includes an at least partially solid body 62. A shape of the body 62 is generally complementary to the shape of the light ring 42. As a result, a bottom surface 64 of the intermediate component 60 may be disposed in vertical alignment and direct contact with an upper surface 54 of the light ring 42 (shown in FIG. 5). The intermediate component 60 includes one or more covers 66 protruding outwardly from the exterior of the component body 62. Each of these covers 66 has a size corresponding to one of the bases 46 such that each cover 66 at least partially surrounds, or in some embodiments encases, a respective base 46 of the light ring 42. The positioning of the covers 66 is intended to block or limit ambient light from interacting with and affecting the light emitted and received by the light devices 48, 50.

In the illustrated, non-limiting embodiment, one or more openings 68 are formed in an upper surface 70 of the body 62. Each opening 68 corresponds to a light source 48 or light receiver 50 and is substantially aligned therewith such that each light device 48, 50 is in optical communication with an area disposed adjacent the upper surface 70 of the intermediate component 60 via the openings 68.

Figure 12:
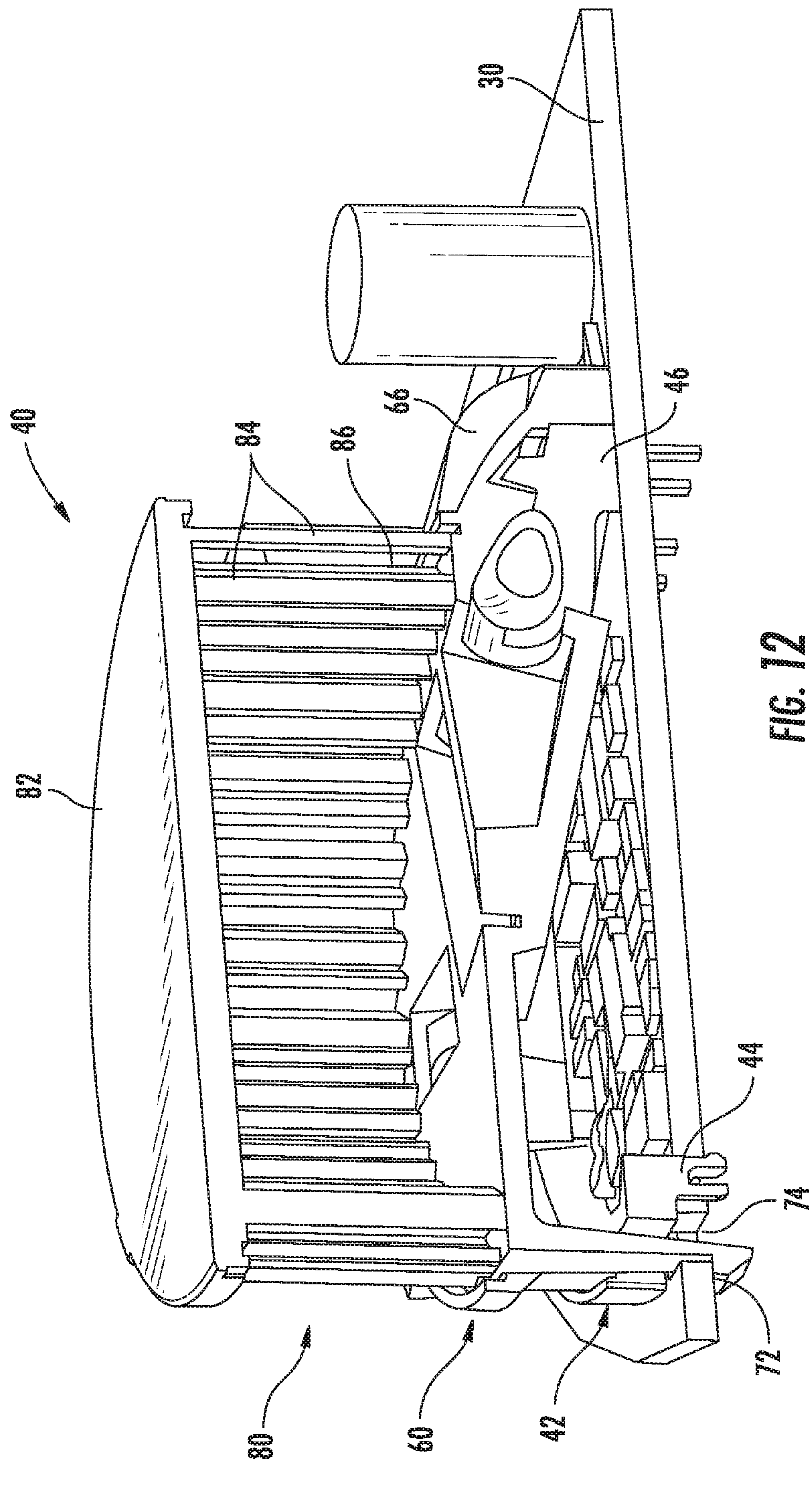
FIG. 12 is a cross-sectional view of the optical chamber assembly mounted to a printed circuit board of a life safety device according to an embodiment.

The intermediate component 60 is configured to removably affix to the printed circuit board 30, such as via a snap fit connection for example. In the illustrated, non-limiting embodiment, one or more resilient tabs 72 protrude downwardly from the body 62 of the intermediate component 60 and are receivable within corresponding openings 74 (see FIG. 12) formed in the printed circuit board, as shown in FIG. 12. Because the light ring 42 is disposed between the intermediate component 60 and the printed circuit board 30, this connection between the tabs 72 and the circuit board 30 restricts movement of the light ring 42 relative to the circuit board 30. However, it should be understood that the engagement described herein is intended as an example only and any suitable mechanism for attaching the intermediate component 60 and/or the light ring 42 to the printed circuit board 30 is contemplated herein.

In the illustrated, non-limiting embodiment of FIGS. 4 and 9-12, the optical chamber assembly 40 additionally includes an optical cover 80 mounted in overlapping arrangement with the intermediate component 60. In an embodiment, a contour of an exterior of the optical cover 80 is generally complementary to the intermediate component 60. However, embodiments where the optical cover 80 has a different shape than the intermediate component 60 are also within the scope of the disclosure.

As shown, the optical cover 80 includes an end piece 82 and a plurality of individual side members 84 extending from the end piece 82. Each of the plurality of side members 84 is substantially identical in shape and the side members 84 are spaced equidistantly about the periphery of the end piece 82. The side members 84 may be generally labyrinth-like in shape are offset from one another by a distance such that a small clearance 86 is formed between adjacent side members 84. Each of these clearances 86 allows ambient air and any particles trapped therein to flow from outside the cover 80 into the interior chamber 88 of the cover 80 defined between the plurality of side members 84 and the adjacent end 70 of the intermediate component 60. The labyrinth arrangement is intended to allow a flow of ambient air through the side members 84 while maximizing the blockage of stray light by limiting any direct light path to the photodiode from outside sources.

Figure 11:
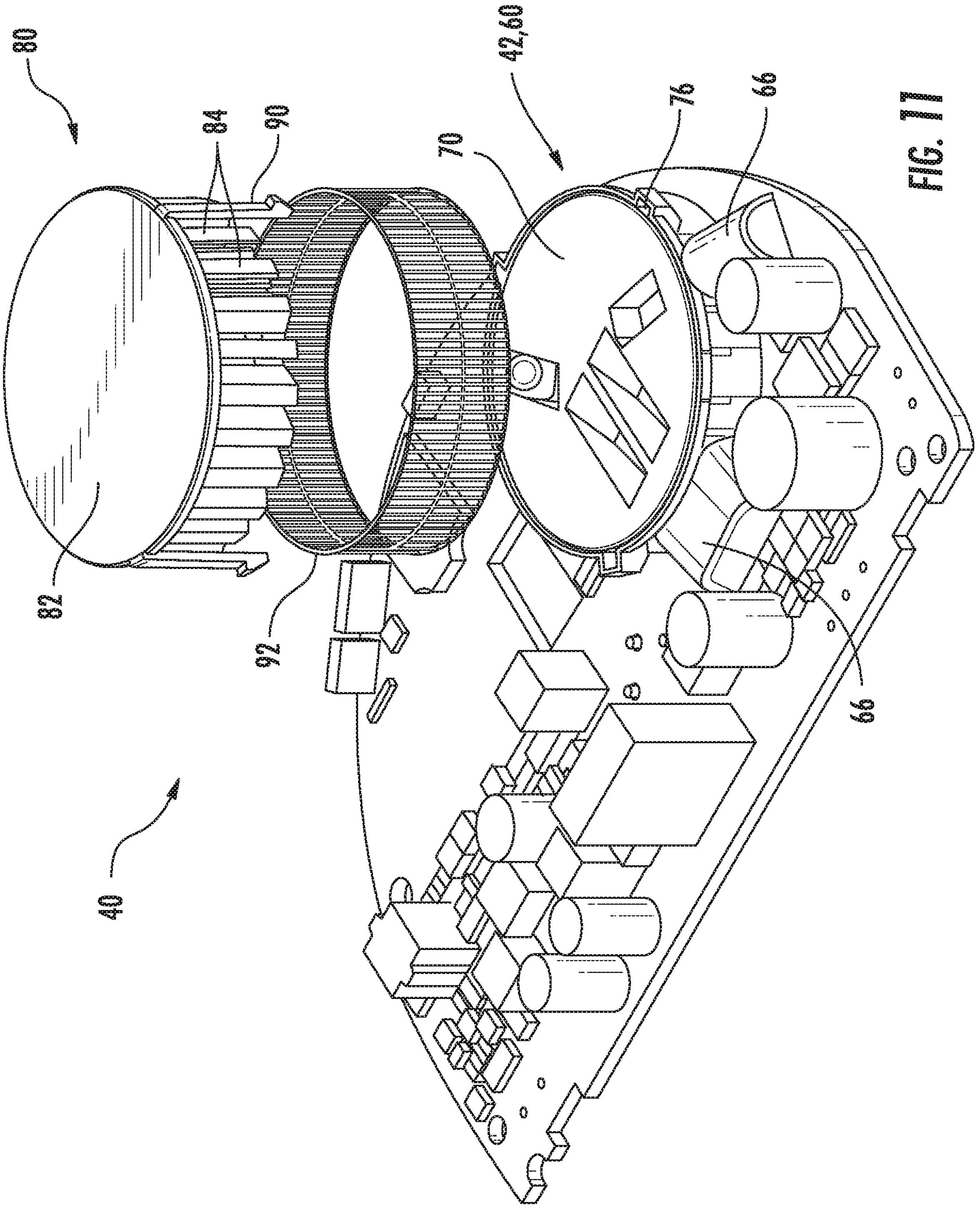
FIG. 11 is a exploded perspective view of the optical chamber assembly mounted to a printed circuit board of a life safety device according to an embodiment.

The optical cover 80 is configured to removably affix to the intermediate component 60. In the illustrated, non-limiting embodiment, one or more resilient tabs 90 protrude downwardly from the optical cover 80. These tabs 90 are receivable within corresponding openings 76 formed in the intermediate component 60, as shown in FIG. 11. The tabs 90 and openings 76 illustrated and described herein for affixing the cover to the intermediate component are intended as an example only and any suitable mechanism for attaching the cover and intermediate component is contemplated herein.

In an embodiment, as shown in FIGS. 3, 4, and 11, the optical chamber assembly 40 may additionally include a screen 92 or other similar component to prevent large particles, debris, and bugs (which may interfere with the proper function of the device 20) from entering the chamber 88 defined between the side members 84 and the upper surface 70 of the intermediate component 60. In an embodiment, best shown in FIG. 3, the screen 92 is wrapped about an exterior surface of the plurality of side members 84. However, in other embodiments, the screen 92 may be affixed to an interior surface of the plurality of side members 84. Regardless of the position of the screen 92, the air being tested must pass through the screen 92 prior to entering into the chamber 88.

The light ring 42, intermediate component 60, and optical cover 80 may be formed from distinct materials. In an embodiment, the light ring 42 is formed from a first electrically insulating, high flame rated material having low light absorbing properties. A material having electrically insulating properties not only provides high electrical potential protection between the printed circuit board 30 and the chamber, but also insulates the wires of the light emitting diode and/or the photodiode from shorting on the electrically conductive portion of the intermediate chamber. A high flame rating, in the V0 or higher range as defined by UL217, provides protection from an internal ignition event, such as caused by the high voltage input provided to the smoke detector. Further, low light absorbing properties may result from a material having a limited amount of carbon filler.

The intermediate component 60 may be formed from a second material different from the material of the light ring 42. The second material may have a high electrical conductivity and high light absorbing properties. The high electrical conductivity of the second material not only performs EMI shielding, but also provides light absorbing properties due to the high carbon filler loading that is present in such materials, such as highly conductive plastic for example. This occurs because high concentrations of carbon filler will absorb light in a wide wavelength band. In addition, such materials improve the signal to noise ratio, absorb stray ambient light, and dissipate static electricity. By dissipating static electricity, the chamber 88 becomes resistant to dust accumulation.

In an embodiment, the optical cover 80 is formed from a third material, different from both the material of the light ring 42 and the material of the intermediate component 60. The optical cover 80 may be formed from any suitable material having high electrical conductivity, high flame rating, and high light absorbing properties. In addition to the benefits of the high conductivity previously described, the flame retardant properties provide protection to help enclose an ignition event in the interior of the smoke detector. This is tested by UL using the 5 inch flame test as described in UL 217.

Figure 13:
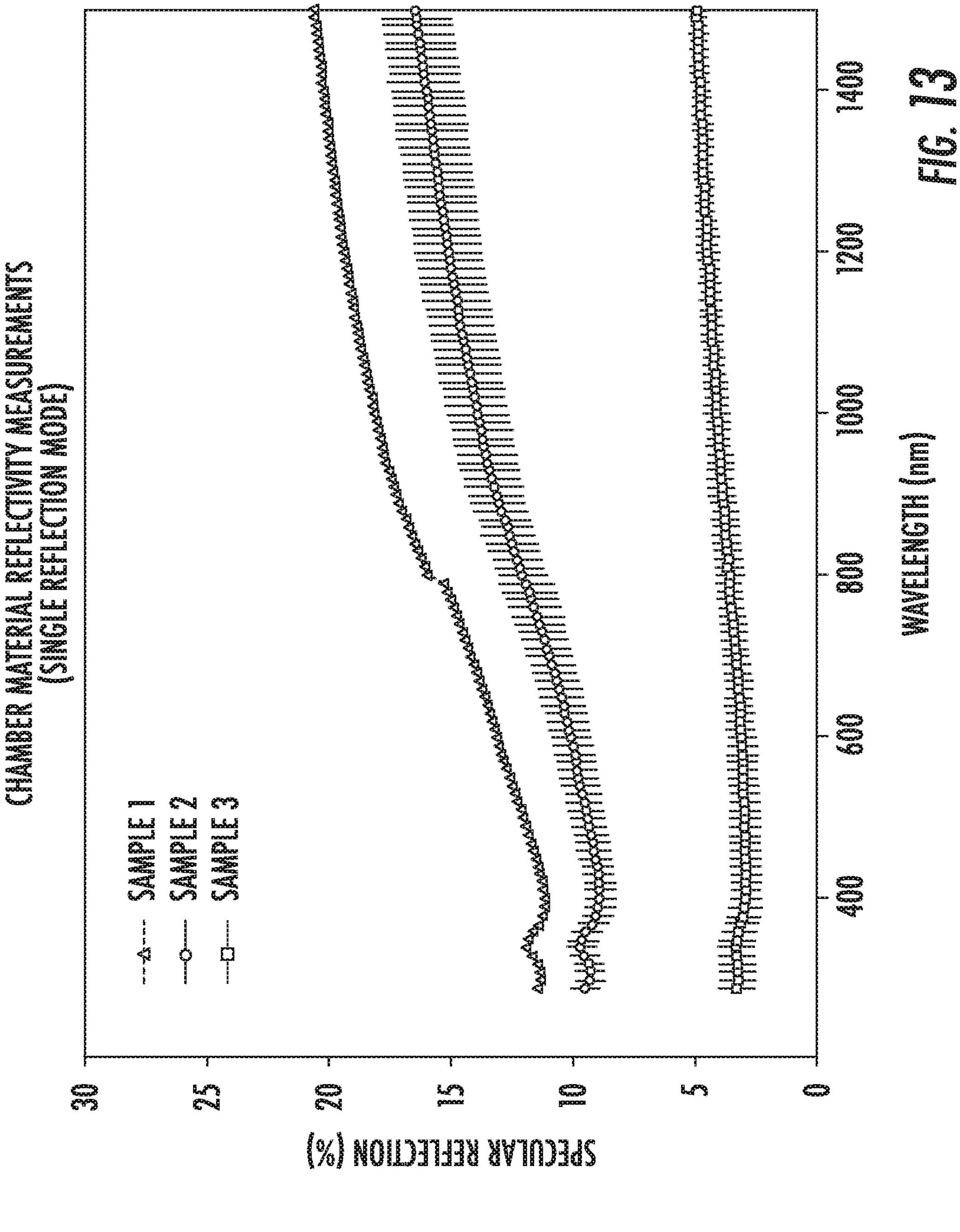
FIG. 13 is a graph identifying the reflectivity of the light ring, intermediate component, and optical cover of the optical chamber assembly according to an embodiment.

As used herein, the term "high flame rating" is directed to a material having a flame rating described as V2 or higher. Examples of ratings included therein are V1, V0, 5VB, and 5VA as defined by UL 94 with a minimum thickness of 0.15 inches. High electrical conductivity refers to conductivity equal to or less than $10^5$ ohms as measured by IEC 61340-2-3 or by ANSI/ESDSTM 11. 11. As used herein, the phrase "high light absorption" is defined by specular reflectivity over a series of light wavelengths (see FIG. 13). Reflectivity is given in a percent which is calculated by a ratio of reflected optical power divided by total optical power incident to object. Light absorbing properties in a plastic material will manifest as a reflectivity below 20% incident light having between wavelengths of 400 and 1400 nanometers.

By forming each component of the optical chamber assembly 40 from a different material, having different optical properties, the overall light absorbing performance is superior to chambers formed from a single material because the properties of each component of the optical chamber assembly 40 may be tailored to the functionality of that component. In addition, the optical assembly 40 as described herein has not only improved noise immunity, but also improved dust resistance of the by restricting external light and particulate matter from entering the interior chamber 88. As a result, the likelihood of the occurrence of false alarms typically caused by inaccuracy due to noise and dust or debris is reduced.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An optical chamber assembly of a detection device comprising:

a light ring for supporting at least one light device;

an optical cover defining an interior chamber of the optical chamber assembly; and an intermediate component disposed between the light ring and the optical cover, wherein the intermediate component optically couples the at least one light device with the interior chamber.

2. The optical chamber assembly of claim 1, wherein the light ring is formed from a first material, the intermediate component is formed from a second material, and the optical cover is formed from a third material, the first material, the second material, and the third material being different.

3. The optical chamber assembly of claim 1, wherein the light ring is formed from an electrically insulating, high flame rated material.

4. The optical chamber assembly of claim 3, wherein light absorbing properties of the intermediate component are greater than light absorbing properties of the light ring.

5. The optical chamber assembly of claim 1, wherein the intermediate component is formed from a highly electrically conductive material.

6. The optical chamber assembly of claim 1, wherein the optical cover is formed from a highly electrically conductive, high flame rated material.

7. The optical chamber assembly of claim 6, wherein light absorbing properties of the optical cover are greater than light absorbing properties of the light ring.

8. The optical chamber assembly of claim 1, wherein the optical cover includes a plurality of openings through which air is provided to the interior chamber.

9. The optical chamber assembly of claim 1, wherein the at least one light device includes a light source and a light receiver.

10. The optical chamber assembly of claim 1, wherein the optical chamber assembly is mounted to a printed circuit board and the intermediate component removably couples the light directly to the printed circuit board.

11. The optical chamber assembly of claim 10, wherein the optical cover is connected to one of a ground, common or zero volt of the printed circuit board.

12. The optical chamber assembly of claim 1, further comprising a screen connected to the optical cover to prevent debris from entering the interior chamber.

* * * * *